Oct. 1, 1968  R. W. HOWITT  3,403,657
POINTER ASSEMBLY
Filed Sept. 8, 1966
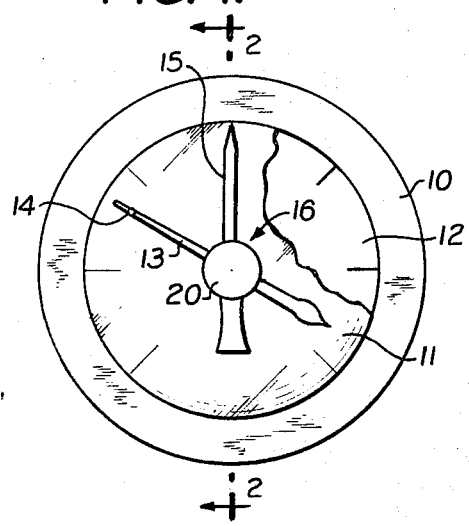
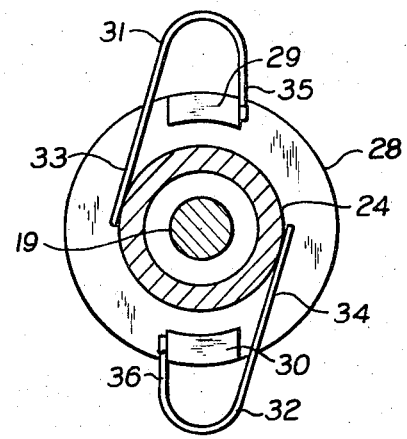
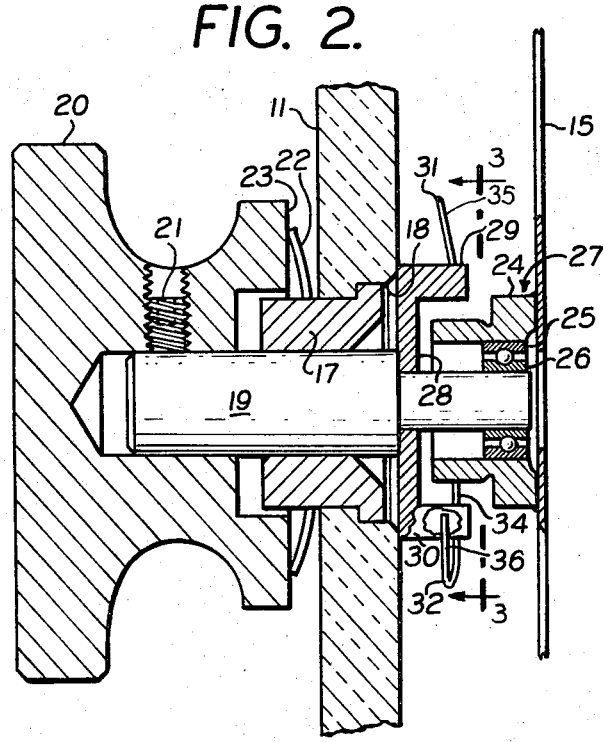
INVENTOR
ROY W. HOWITT
BY
Byerly, Townsend, Watson & Churchill
ATTORNEYS.

United States Patent Office 3,403,657
Patented Oct. 1, 1968

3,403,657
POINTER ASSEMBLY
Roy W. Howitt, Brentwood, N.Y., assignor to Computer Instruments Corporation, Hempstead, N.Y., a corporation of New York
Filed Sept. 8, 1966, Ser. No. 577,900
4 Claims. (Cl. 116—129)

The present invention relates to dial pointers for indicating the maximum or minimum reading of a dial type gauge.

Pointer assemblies of the type which follow the travel of a gauge pointer for indicating the maximum travel thereof, whether in a clockwise or counter-clockwise direction, are well known. Ideally, the pointer of such an assembly should exert no reactive force upon the driving gauge pointer while being able to stop without overtravel when the gauge pointer ceases forward movement. Unfortunately, the two requirements are incompatible. In the past anti-friction bearings have been used for mounting the pointer, but while this enables the load on the gauge to be maintained at a minimum, a simple arrangement for preventing overtravel has been lacking.

Therefore, an object of the present invention is to provide a pointer assembly of the above type which requires minimal force to drive it and has a braking or motion retarding arrangement which cannot cause binding of the anti-friction bearing, is essentially self-adjusting, is inexpensive to manufacture, and is of utmost simplicity.

In accordance with the invention there is provided a pointer assembly comprising a dial crystal having an exterior and an interior face, a bushing secured in an aperture in the crystal, a shaft journaled in the bushing and projecting on both sides of the crystal, means provided on the end of the shaft which projects from the exterior face of the crystal for enabling manual rotation thereof, means for applying a force to the shaft resisting rotation thereof, a pointer, an anti-friction bearing assembly supporting the pointer for rotation about the end of the shaft which projects from the interior face of the crystal, the bearing assembly having a radially outer element disposed for rotation about a radially inner element, and spring means fixedly mounted on the shaft and frictionally engaging the outer element of the bearing assembly at diametrically opposed points, the spring means being arranged to bear radially upon the outer element to resist rotation of the pointer relative to the shaft.

The invention will be better understood after reading the following detailed description of the presently preferred embodiment thereof with reference to the appended drawings in which:

FIGURE 1 is an elevational view of a dial gauge provided with the pointer assembly;

FIGURE 2 is a sectional view taken along line 2—2 in FIGURE 1; and

FIGURE 3 is a sectional view taken along line 3—3 in FIGURE 2 and showing the spring means in detail.

Referring to the drawings, the face of a dial gauge is shown in FIGURE 1. It includes a bezel 10 securing a crystal 11 to a dial face 12 provided with a gauge pointer or index 13. The pointer 13 carries a pin or finger 14 for engaging the pointer 15 of the maximum gauge indicator shown generally at 16. It will be understood that the pointer 13 is rotated by any known meter or gauge movement. The pin 14 encounters the pointer 15 and carries it to the point of maximum travel of pointer 13.

Referring to FIGURES 2 and 3 it will be seen that a bushing 17 is secured in any known manner in an aperture 18 in the crystal 11. A shaft 19 is journaled in bushing 17 and projects on both sides of crystal 11. A knob 20 is secured by a set screw 21, or other suitable means, to that end of the shaft 19 which projects from the exterior face of the crystal for enabling manual rotation thereof. See also FIGURE 1. A spring washer or ripple spring 22 is confined between the exterior face of crystal 11 and the face 23 of knob 20 for applying, through the knob, a force to the shaft 19 resisting rotation thereof.

The pointer 15 is preferably made of light weight material such as plastic or the like. It is secured by adhesive or other known means to the sleeve 24 which with the raceway 25 constitutes the radially outer element of an anti-friction bearing assembly. The radially inner element of the bearing is represented by the raceway 26 mounted on the reduced diameter end of shaft 19, as shown. The bearing assembly, shown generally at 27, supports the pointer 15 for rotation about the end of shaft 19.

A disc 28 is mounted on the reduced end of shaft 19 between the crystal 11 and the bearing assembly 27. It can be soldered or brazed thereto or otherwise secured against movement relative to the shaft. Axial projections or ears are formed integral with said disc at the periphery thereof at 29 and 30. The projections 29 and 30 and disc 28 constitute a yoke-like structure with the projections 29 and 30, as the ends of the yoke, disposed radially outwardly from and overlying the sleeve 24, and, thus, the outer element of the bearing assembly 27.

Fastened to each of the ears 29 and 30 is a generally U-shaped member 31 and 32, respectively, of fine spring wire. The member 31 has an arm 33 disposed tangent to the sleeve 24 while member 32 has a similar arm 34 tangent to sleeve 24 on the diametrically opposite side. The other arm 35 of spring member 31 is attached by soldering or the like to the side of ear 29, as shown. Similarly, the other arm 36 of member 32 is joined to ear 30.

The members 31 and 32 are formed such that a tighter bend is assumed in the absence of sleeve 24. Thus, the stresses developed in the bight of the bend with sleeve 24 present tend to urge the arms 33 and 34 toward each other at the point of engagement with sleeve 24. That is, the arms 33 and 34 bear radially (as viewed in FIGURE 3) upon the surface of sleeve 24. It has been found that the slight amount of friction caused by the embrace of arms 33 and 34 is sufficient to prevent overshoot of the pointer 15. At the same time the retarding force is not such as to place an objectionable load on the main gauge pointer 13.

A further advantage is that upon manual reset of the pointer 15 through manipulation of knob 20 the spring members 31 and 32 will slip on sleeve 24 before pointer 15 can be driven with damaging force against the usual end stops.

By arranging spring arms 33 and 34 to bear radially against opposite sides of sleeve 24 there is substantially no displacement force exerted against the outer element of the bearing assembly. There is neither axial loading of the bearing nor a cocking force applied thereto, nor any side loading.

The invention has been described with reference to a specific embodiment thereof. It will be understood that changes can be made therein without departing from the true spirit of the invention as defined in the appended claims.

What is claimed is:

1. A pointer assembly of the type which travels with a gauge pointer and indicates the maximum travel thereof, said assembly comprising: a dial crystal having an exterior and an interior face, an aperture in said crystal, a bushing secured in said aperture, a shaft journaled in said bushing and projecting from both sides of said crystal, drive means provided on the end of said shaft which projects from the exterior face of said crystal for enabling manual rotation thereof, means coupled between said crystal and said shaft for applying a force to said shaft resisting rotation thereof relative to said crystal, a pointer, an anti-friction bearing assembly mounted on the opposite end of said shaft from said drive means and supporting said pointer for rotation about said shaft, said bearing assembly having a radially outer element disposed for rotation about a radially inner element, and spring means fixedly mounted on said shaft and frictionally engaging said outer element of the bearing assembly at diametrically opposed points, said spring means being arranged to bear radially inwardly upon said outer element to resist rotation of said pointer relative to said shaft.

2. A pointer assembly according to claim 1, wherein said spring means comprises two arms disposed tangent to said outer element of the bearing assembly, one on each side thereof, and means for resiliently urging said arms toward each other at the point of engagement with said outer element.

3. A pointer assembly according to claim 1, wherein said spring means comprises two generally U-shaped members of spring wire, one arm of each U-shaped member being disposed tangent to said outer element of the bearing assembly, one on each side thereof, the other arm of each U-shaped member being fixedly mounted on said shaft with the U-shaped members under stress such that said arms which engage said outer element are urged resiliently toward each other at the point of engagement therewith.

4. A pointer assembly according to claim 3, wherein said other arms of the U-shaped members are mounted on said shaft by means of a yoke-like structure having its ends disposed radially outwardly from and overlying said outer element of the bearing assembly on opposite sides thereof, said yoke-like structure being joined intermediate its ends to said shaft, and said other arms of the U-shaped members are joined respectively to opposite ends of said yoke-like structure.

References Cited
UNITED STATES PATENTS

| | | | |
|---|---|---|---|
| 925,814 | 6/1909 | Jones | 116—129 |
| 1,807,215 | 5/1931 | Johnson | 116—129 |
| 2,007,680 | 7/1935 | Hancom | 116—129 |

LOUIS J. CAPOZI, *Primary Examiner.*